United States Patent
Krishnasamy et al.

(10) Patent No.: US 10,223,050 B2
(45) Date of Patent: *Mar. 5, 2019

(54) METHOD AND APPARATUS FOR AUTOMATICALLY PROCESSING JOB INTERRUPTIONS CAUSED BY A PORTABLE MEMORY DEVICE IN A PRINT SYSTEM

(71) Applicant: Xerox Corporation, Norwalk, CT (US)

(72) Inventors: Muralidaran Krishnasamy, Tamil Nadu (IN); Narayan Kesavan, Tamil Nadu (IN); Raj Kumar, Tamil Nadu (IN); Karthikeyan Devaraj, Tamil Nadu (IN); Dipta Chatterjee, Tamil Nadu (IN); Siva Perumal, Andaman and Nicobar Islands (IN)

(73) Assignee: Xerox Corporation, Norwalk, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/653,801

(22) Filed: Jul. 19, 2017

(65) Prior Publication Data

US 2019/0026051 A1    Jan. 24, 2019

(51) Int. Cl.
*G06F 3/12* (2006.01)
*G06F 9/48* (2006.01)

(52) U.S. Cl.
CPC .......... *G06F 3/1254* (2013.01); *G06F 3/1204* (2013.01); *G06F 9/4831* (2013.01); *G06F 3/1263* (2013.01)

(58) Field of Classification Search
USPC ................................ 358/1.1–3.29, 1.11–1.18
See application file for complete search history.

(56) References Cited

U.S. PATENT DOCUMENTS

| | | | |
|---|---|---|---|
| 5,832,301 A | * | 11/1998 | Yamaguchi ........... G06F 3/1212 710/48 |
| 5,860,066 A | | 1/1999 | Rouse |
| 5,969,826 A | | 10/1999 | Dash et al. |
| 7,844,749 B2 | | 11/2010 | Tredoux et al. |
| 7,869,063 B2 | | 1/2011 | Fukano |
| RE42,290 E | | 4/2011 | Ogino |
| 7,933,035 B2 | | 4/2011 | Okada et al. |
| 7,952,731 B2 | | 5/2011 | Utsunomiya et al. |
| 7,969,593 B2 | | 6/2011 | Toda |
| 8,115,949 B2 | | 2/2012 | Toda |
| 8,441,666 B2 | | 5/2013 | Tomii et al. |

(Continued)

*Primary Examiner* — Marcellus J Augustin
(74) *Attorney, Agent, or Firm* — Fox Rothschild LLP

(57) ABSTRACT

A print device has a port, a print engine, a processing device and a memory. The print device is configured to detect that a portable memory device has become communicatively connected to the port, retrieve a digital document file to be printed and a print instruction from the portable memory device, determine that a first print job is being performed in the print device, suspend the first print job, determine a second print job derived from the digital document file, and automatically perform the second print job based on the print instruction. The print device further detects that the second print job has been completed or interrupted, and automatically resumes the first print job. If the second print job is directed to the same output tray as the first print job, the print device may also print a separator sheet to the output tray before performing the second print job.

18 Claims, 8 Drawing Sheets

(56) References Cited

U.S. PATENT DOCUMENTS

| | | | |
|---|---|---|---|
| 8,599,395 B2* | 12/2013 | Sasakura | G06F 3/1215 358/1.1 |
| 8,817,319 B2 | 8/2014 | Martin | |
| 8,947,683 B2* | 2/2015 | Tominaga | G06F 3/1204 358/1.13 |
| 9,009,359 B2 | 4/2015 | Ashok et al. | |
| 9,185,245 B2 | 11/2015 | Miyachi et al. | |
| 9,245,130 B2 | 1/2016 | Ashok et al. | |
| 9,245,131 B2 | 1/2016 | Ashok et al. | |
| 9,661,170 B2 | 5/2017 | Mitsuyama et al. | |
| 9,674,383 B2 | 6/2017 | Suzuki | |
| 9,740,447 B1* | 8/2017 | Krishnasamy | G06F 3/1273 |
| 9,800,752 B2 | 10/2017 | Hirasawa | |
| 9,854,105 B1* | 12/2017 | Krishnasamy | H04N 1/00037 |
| 2005/0051942 A1 | 3/2005 | Kubo et al. | |
| 2006/0132841 A1 | 6/2006 | Park et al. | |
| 2006/0221372 A1 | 10/2006 | Onishi et al. | |
| 2006/0268310 A1 | 11/2006 | Tamai et al. | |
| 2007/0109600 A1 | 5/2007 | Ren et al. | |
| 2007/0229899 A1 | 10/2007 | Okuda | |
| 2008/0080001 A1 | 4/2008 | Yamada | |
| 2008/0198412 A1 | 8/2008 | Yamada | |
| 2009/0128862 A1 | 5/2009 | Nolepa et al. | |
| 2009/0241120 A1* | 9/2009 | Nam | G06F 9/4881 718/103 |
| 2010/0188682 A1 | 7/2010 | Shirai | |
| 2010/0231968 A1 | 9/2010 | Hirasawa et al. | |
| 2011/0085205 A1 | 4/2011 | Ouchi | |
| 2011/0090533 A1 | 4/2011 | Shimizu | |
| 2011/0242580 A1 | 10/2011 | Tran | |
| 2011/0292430 A1 | 12/2011 | Kang et al. | |
| 2012/0069375 A1* | 3/2012 | Sasakura | G06F 3/1215 358/1.13 |
| 2012/0140266 A1 | 6/2012 | Takayama | |
| 2012/0158956 A1 | 6/2012 | Sako | |
| 2012/0194850 A1 | 8/2012 | K. et al. | |
| 2012/0218605 A1 | 8/2012 | Yamada | |
| 2012/0257232 A1 | 10/2012 | Koike | |
| 2012/0307316 A1 | 12/2012 | De Muelenaere et al. | |
| 2013/0120799 A1 | 5/2013 | Maeda | |
| 2016/0086068 A1* | 3/2016 | Nakamura | G06K 15/403 358/1.15 |
| 2016/0241736 A1 | 8/2016 | Saluja et al. | |
| 2016/0253130 A1* | 9/2016 | Rajalingam | G06F 3/1205 358/1.15 |
| 2017/0139652 A1* | 5/2017 | Kesavan | G06F 3/128 |

\* cited by examiner

METHOD AND APPARATUS FOR AUTOMATICALLY PROCESSING JOB INTERRUPTIONS CAUSED BY A PORTABLE MEMORY DEVICE IN A PRINT SYSTEM

BACKGROUND

This disclosure relates to a system for automatically printing documents that are stored on a portable memory device with little or no user activation of a local user interface (LUI), and in particular to a method and apparatus for automatically processing job interruptions caused by plugging in a portable memory device to a printer.

In performing a conventional print job in a document system or a multi-function peripheral (MFP), such as sending a file to the printer via network or plugging in a USB to a printer, a user normally needs to perform several steps. For example, in a normal print job in a networked environment, the user needs to send a print job from a computer and walk to the printer to retrieve the printed document. In another example, the user plugs into the printer a USB or other media card that stores documents to be printed. The user needs to use the LUI to browse the file directory on the USB card and select the files to be printed. In some scenarios, a print job that prints the documents from the USB card in one printer may be interrupted, and it needs to be resumed on another printer. In other scenarios, when the user plugs a USB card into the printer, a currently active print job in the printer may still exist. In these scenarios, how to automatically process job interruptions with little or no user activation of an LUI even adds more complexities to the print job processing in the document system.

This document describes a system that may address at least some of the issues described above.

SUMMARY

In some scenarios, a document printing system includes a print device that has a port configured to communicate with a portable memory device, a print engine, a processing device communicatively coupled to the port and the print engine, and a non-transitory, computer-readable medium containing programming instructions that are configured to cause the processing device to perform certain functions. The print device is configured to detect a trigger event by determining that a portable memory device has become communicatively connected to the port, and retrieve a digital document file to be printed and a print instruction from the portable memory device. The print device also determines that a first print job is being performed in the print device, suspends performance of the first print job, determines a second print job that is derived from the digital document file, and automatically causes the print engine to perform the second print job based on the print instruction. The print device further detects that the second print job has been completed or interrupted, and automatically resumes the first print job upon detecting that the second print job has been completed or interrupted.

In some or other scenarios, the print device may determine an output paper tray to which a document represented in the digital document file is to be printed, and print the document to the output paper tray. The print device may automatically determine the output paper tray based on at least one of the following: a capability of the output paper tray, a requirement of the second print job, or the print instruction. Alternatively, and/or additionally, the print device may be configured to prompt a user to manually select the output paper tray. The print device may further determine an original paper tray to which the first print job was directed. If the output paper tray is the same as the original paper tray, the print device may output a separator sheet before printing the document to the output paper tray.

The print device may also include a communication port for communicating with a data store that contains a print history and obtaining information from the print history. When retrieving the digital document file to be printed from the portable memory device, the print device may access the print history from the data store, and use the print history to determine that the digital document file has not been printed and retrieve that digital document file to be printed. When the second print job has been completed, the print device may also transmit a communication to the data store to update the print history to reflect that the digital document file is printed.

Additionally, and/or alternatively, the print device may be configured to retrieve additional digital document files from the portable memory device. The second print job may also be derived from the additional digital document files. In the process of determining that the second print job has been completed, the print device may be configured to (i) detect that the digital document file in the portable memory device is printed; (ii) check the additional digital document files to determine a next digital document file to be printed; (iii) print a document represented in the next digital document file based on the print instruction; and (iv) repeat steps (ii) and (iii) until all documents of the additional digital document files are printed.

Methods may be implemented in the above illustrated print device to automatically process job interruptions in the document printing system. In some or other scenarios, a method may include detecting a trigger event by determining that a portable memory device has become communicatively connected to a port of the print device; retrieving a digital document file to be printed and a print instruction from the portable memory device; determining that a first print job is being performed in the print device; suspending performance of the first print job; determining a second print job that is derived from the digital document file; automatically performing the second print job based on the print instruction; detecting that the second print job has been completed or interrupted; and automatically resuming the first print job upon detecting that the second print job has been completed or interrupted.

DETAILED DESCRIPTION

Figure 1:
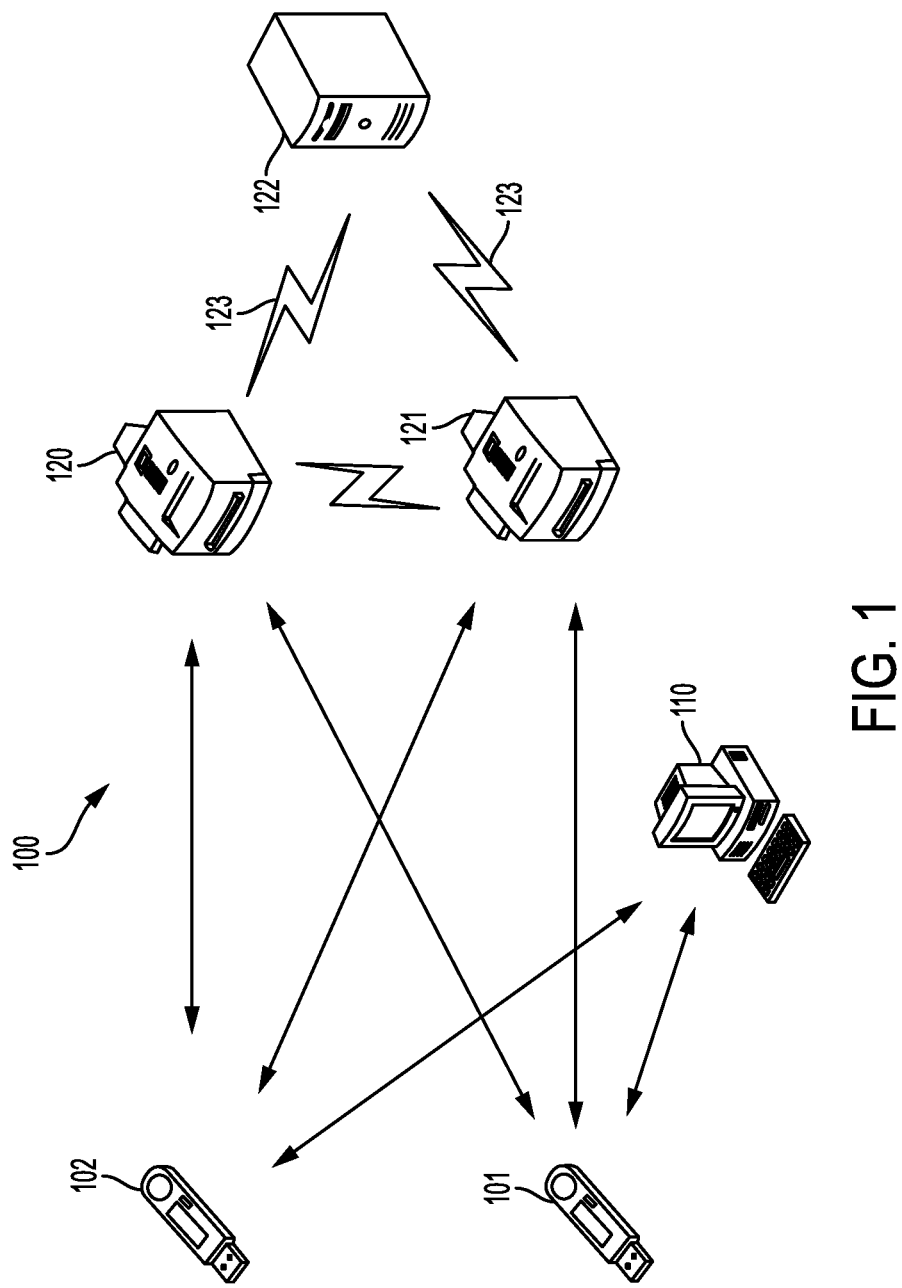
FIG. 1 illustrates an example of a system for automatically processing job interruptions caused by a portable memory device in a print system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The term "local user interface" or "LUI" of a device refers to a user interface peripheral that is mounted to or built in an electronic device for users to perform various operations on the device. A local user interface typically includes a combination of hardware (such as a keyboard, keypad, touch-sensitive display and/or microphone) and software for presenting prompts to a user and receiving input from the user via the hardware.

The term "automatically" refers to causing a machine to perform an action without requiring any user interaction, such as requiring the user to push a button or enter a command, before the machine will perform the action.

The term "portable memory device" refers to a portable device that has a non-transitory storage medium capable of storing data, such as a universal serial bus (USB) flash drive, a secure digital (SD) card or microSD card, a portable hard disk, a portable media player or any other external storage device that has such storing capability. In various embodiments, the portable memory device does not need to include a processor. The portable memory device will typically have a file system. The portable memory device will include a data transfer device, such as a USB connector for a USB drive, input/output ports of an SD card or a radio unit (transceiver) of a near-field communication device such as a Bluetooth device.

A "computer" or "computing device" refers to a device that includes a processor and non-transitory, computer-readable memory. The memory may contain program instructions that, when executed by the processor, cause the computing device to perform one or more operations according to the program instructions. Examples of computing devices include personal computers, servers, mainframes, gaming systems, televisions, and portable electronic devices such as smartphones, smart watches, wearable electronic devices, digital cameras, fitness tracking devices, tablet computers, laptop computers, media players and the like.

The term "physical document" refers to a hard-copy document on a substrate that is printed off of a printer or that can be scanned into a digital form. It may consist of a single sheet or a set of sheets.

The term "document system" refers to a system of devices that communicate with each other for handling document related jobs, in particular, printing, copying, electronic storing, facsimile, transmitting or receiving (including fax, email, or communicating with a remote device), and/or image scanning of a physical document.

The term "digital document file," "document file," "electronic document" or "electronic document file" refers to a digital representation of a document such as a word processor file, a PDF file, or a bitmap file (e.g. TIFF, JPG, PNG files etc.) that is stored in a computer readable memory or a storage medium. A document file may be an electronic representation of a physical document that contains one or multiple pages.

The term "print device" refers to a machine having hardware capable of receiving a digital document file and use the information from the file and associated print instructions to print a document represented in the file on a substrate and produce a physical document. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. A print device may have additional capabilities such as scanning or faxing and thus may be a multifunction device.

A "print job" refers to a set of instructions that causes a print device to print one or more document files. In this document, the set of instructions may be from a user to a print device, or it may be generated by a system or the print device after detecting a trigger event.

With reference to FIG. 1, a document system 100 may include one or more print devices, for example, print devices 120, 121, computers 110, one or more data stores 122, and/or communication links 123. Each print device 120, 121 is capable of reading a portable memory device 101, 102 for instant printing of a digital document file. One or more portable memory devices 101, 102 may store the digital document file with print instructions in a designated folder, e.g. a folder with a designated filename such as "\Insta-print." A print device, e.g. 120, may extract the digital document file and print instructions from the portable memory device 101 or 102 and print a digital document file based on the print instructions.

In some scenarios, the print device 120 can detect a trigger event, e.g., a portable memory device 101 or 102 is plugged into or otherwise communicatively connected to the print device 120, and/or the portable memory device contains a folder of the designated name. Then, in response to detecting the trigger event, the print device 120 will identify one or more document files to be printed from the portable memory device. The print device will also read the print instructions from the portable memory device 101 or 102 or the default print instructions from the print device itself. The print device will also determine whether there is any current print job active in the print device. If there is no current print job active, the print device will instantly print all of the document files stored in the designated folder of the portable memory device. If there is a current print job active, the print device will suspend performance of the current active print job and start printing all of the document files stored in the designated folder of the portable memory device.

Additionally, before suspending any current print job, the print device may determine the priority of the current print job and the priority of any new print job derived from the document files stored in the portable memory device. If the priority of the current print job is lower than that of the new print job, the print device suspends the current print job and performs the new print job; otherwise, the print device will continue finishing the current print job.

Additionally, and/or alternatively, the print device may also determine the output tray of the new print job, or prompt the user to select the output tray. If the output tray is the same as the original output tray to which the current print job is directed, the print device may output a separator sheet before performing the new print job. Otherwise, the print device may directly print to the output tray.

Additionally, the system may include a data store 122, which is a set of one or more computer-readable medium devices that stores a print history, which is updated whenever a print job is complete. The data store 122 may be located remotely and accessible to any print device via a communication link 123. Alternatively, the data store 122 may reside locally on the print device. In some scenarios, the print history may store a list of names of the document files that have been printed. The print history may be a general print history that applies to all users. In other scenarios, the print history may be associated with a user and stores the information about the past print jobs of the user.

After detecting the trigger event, and identifying one or more document files to be printed from the portable memory device, but before retrieving the documents to be printed, the print device may check the document files on the portable memory device against the print history and determine what documents files need to be printed. Then the print device may retrieve the document files to be printed from the portable memory device.

Alternatively, and/or additionally, the portable memory device 101, 102 may be pre-configured with default instructions by a computing device 110 via a web user interface (web-UI). Alternatively, the computing device 110 may be used to create the file system on the portable memory device. Additionally, the user may plug the portable memory device into a computer and re-configure the instructions at any time.

Figure 2:
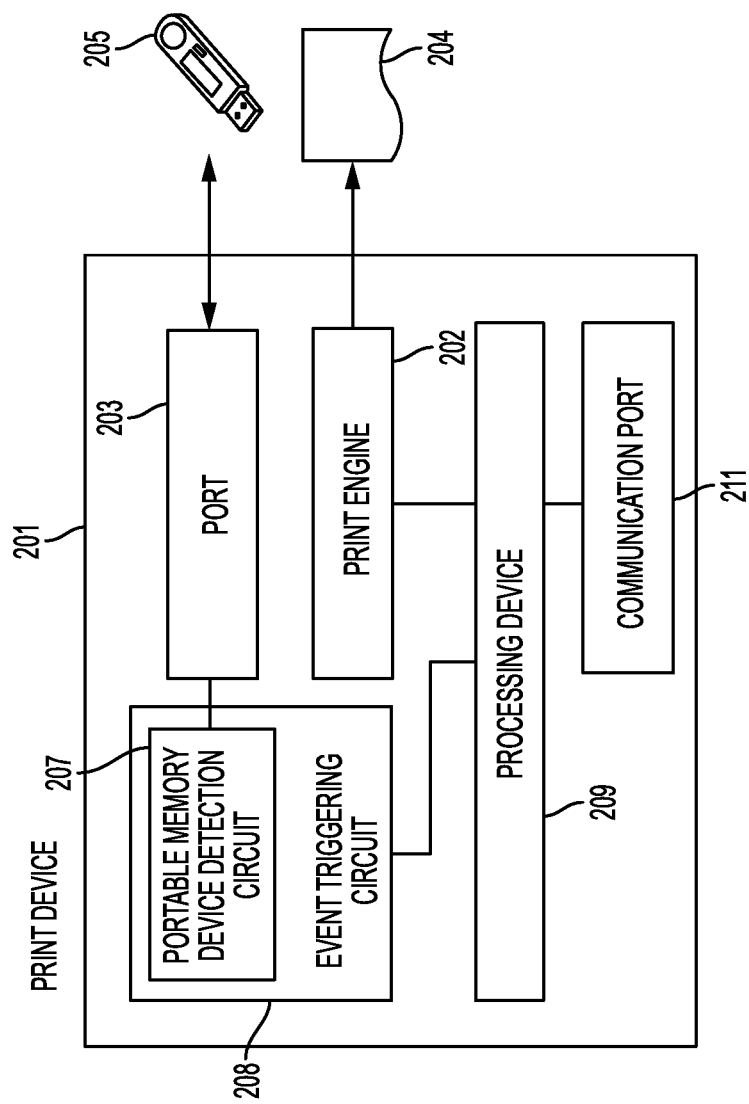
FIG. 2 illustrates a diagram of an example of a print device.

In FIG. 2, various components in an example of a print device are described in detail. The print device 201 may include a processing device 209 that is communicatively coupled to a print engine 202 and configured to cause the print engine to print document files and produce the paper printouts 204. The processing device 209 may also be communicatively coupled to a communication port 211 and cause the communication port to communicate with a data store or other device, wired or wirelessly.

The print device will automatically print the document files stored on any portable memory device that is connected or communicatively coupled to the print device, without user intervention. The print device may also include a port 203 for plugging in a portable memory device. Additionally, the print device may include an event triggering circuit 208 that triggers the print device to perform certain operations. The event triggering circuit may include a portable memory device detection circuit 207 that may be communicatively coupled to the port 203. When a portable memory device 205 is plugged into the port 203, the portable memory device detection circuit may detect the status change of the port and subsequently generate a trigger to the event trigger circuit, indicating that the user is initiating a new print job.

Alternatively and/or additionally, the print device may be capable of pairing with a portable memory device wirelessly, such as via Wi-Fi, Bluetooth or other near-field or short range communication protocols. The event triggering circuit may also include a communication detection circuit that may be communicatively coupled to the communication port 211. The communication detection circuit may be capable of detecting when a portable memory device is communicatively coupled to the communication port 211 of the print device. The communication port 211 may also be capable of communicating with a data store and allowing the print device to update and retrieve a print history in the data store. The print device will include program instructions that can cause the print device to automatically take certain actions in response to detecting that a memory device has been communicatively coupled or connected to the print device. This is further explained with reference to FIGS. 3A and 3B.

Figure 3A:
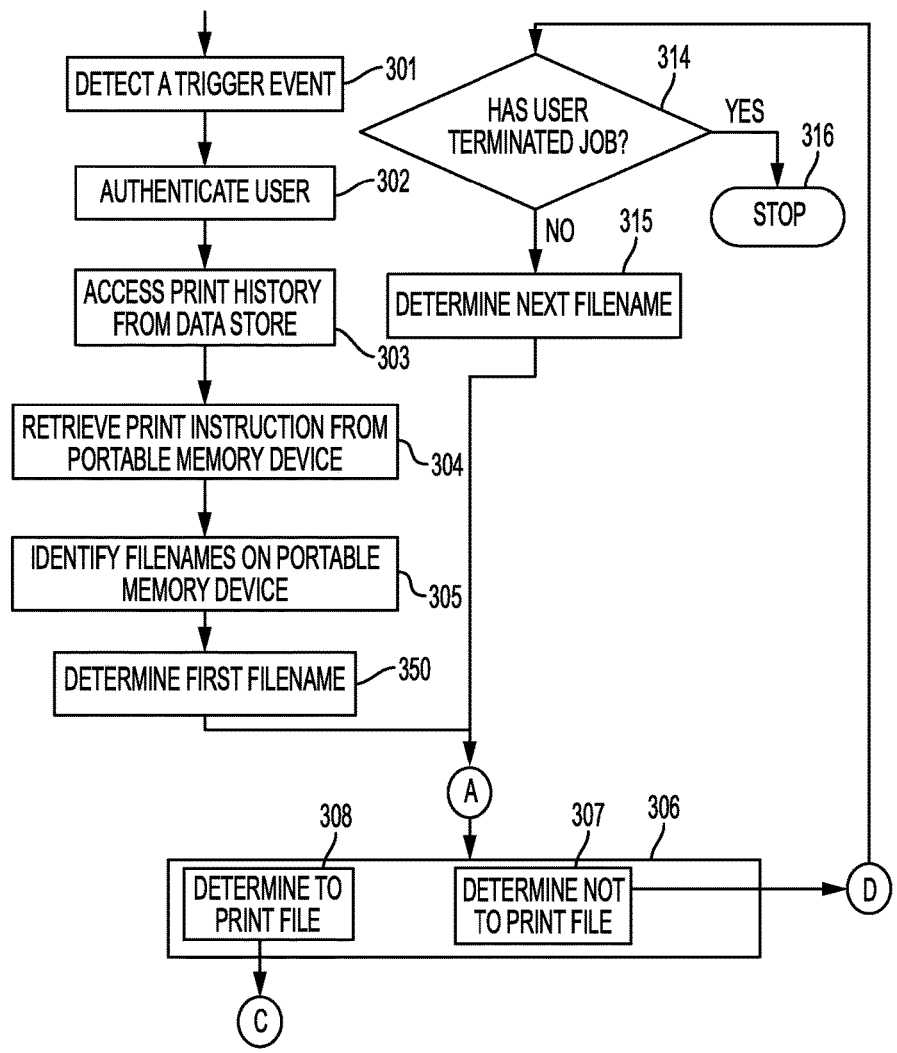
FIGS. 3A and 3B illustrate a diagram of an example of a process for automatically printing, interrupting and resuming a print job.

In FIG. 3A, methods for accomplishing various tasks in the system disclosed in FIGS. 1 and 2 are provided. In some scenarios, a method for automatic printing of a document may include detecting a trigger event 301 that is indicative that a user has initiated a print job. In detecting the trigger event, the print device may receive a trigger, indicating that a portable memory device is plugged into the port of the print device or communicatively connected to the print device.

Additionally, the system may retrieve a print instruction from the portable memory device 304. In one example, a user has plugged a USB flash drive into the print device. The USB flash drive may have a designated folder, e.g. a file named "\insta-print" or any other name designated for storing document files to be printed. The designated folder, the root of the portable memory device file directory, or a sub-folder thereof, may also be designated for storing the document files to be printed. The designated folder on the portable memory device may also be designated for storing the print instructions, such as orientation, margins, scaling, print resolution, effects, color management and finishing options. Optionally, once the print device detects the trigger event, the print device may authenticate the user 302, such as by prompting the user for a credential such as a username and password, and upon verification of the credential, the print device may access the print history associated with the user from the data store 303.

In some scenarios, the print instructions are contained in a print instruction file, such as in the XML format, and the print device may parse the XML print instruction file and extract relevant fields for print instructions. Alternatively and/or additionally, the print instructions may be stored in a non-transitory memory built in the print device. The print device may include program instructions that can retrieve the print instructions from a default file in the portable memory device (e.g. print-instruction.xml) or may use the default print instructions stored in the print device.

The print device may further identify the filenames of one or more document files on the portable memory device 305, determine the first filename 350 and determine whether to print the document file associated with the first filename 306. The process of determination 306 may determine to print the document file 308 or not to print the document file 307, the details of which will be explained in FIG. 5. Once the print device determines not to print the document file 307, the print device may determine the next filename 315 in the remaining document files and repeat the process of whether to print the document file 306 associated with the next filename that is checked. The print device may repeat checking all of the remaining document files in the portable device until all documents of the document files are printed. Alternatively and/or additionally, the device may allow the user to terminate a print job, for example, by making selections on the LUI or pushing a hard "Cancel" button on the device. Optionally, before determining the next filename 315, the print device may determine whether the user has terminated 314, and if the user has terminated a job, the device will stop 316; otherwise, the device will continue.

Figure 3B:
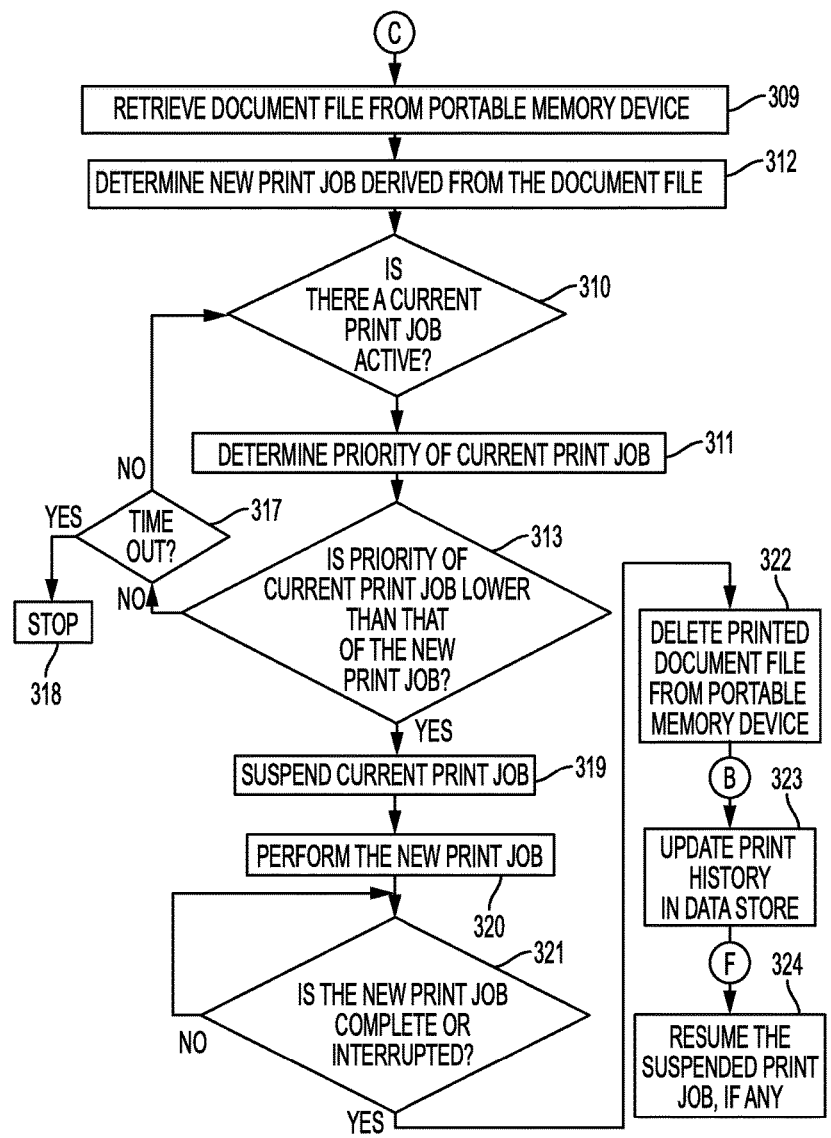

In FIG. 3B, once the print device determines to print the document file, the print device will retrieve the document files from the portable memory device 309. The print device will determine a new print job (second print job) derived from the retrieved document files 312. The print device may also determine whether there is a current print job (first print job) being performed in the print device 310. If the print device so determines, it may suspend performance of the current (first) print job 319, and automatically perform the new (second) print job based on the print instructions 320. Otherwise, the print device may instantly perform the new (second) print job based on the print instructions 320.

Optionally, before suspending the current (first) print job 319, the print device may determine the priority of the current print job 311, and determine whether the priority of the current print job is lower than that of the new print job 313. If the print device so determines, the print device may proceed to suspend the current (first) print job 319. Otherwise, the print device may continue finishing the current print job. Additionally, when the priority of a current print job in the print device is higher than the priority of a new print job derived from document files in the portable memory device, the print device may simply enter into an idle mode and do nothing.

Alternatively, within a time-out period 317, the print device may continuously check whether there is a current print job active 310. In case the current print job is finished within the time-out period, the print device will determine that there is no current print job, then the print device will proceed to perform the new print job 320. After the time-out period, the print device may stop 318 or enter into idle mode, waiting for further commands or triggering events to occur.

If the print device has suspended the current print job 319 and started to perform a new (second) print job 320, the print device will continue to monitor the status of the new (second) print job. If the print device determines that the new (second) print job has been completed or interrupted 321, the print device may resume the suspended first print job (if any) 324.

In some scenarios, the print device may be configured to preset priorities for print jobs in the print device, which will be described in further detail below. The print device may allow a user, such as receive a user input via a LUI or remotely, to set the priorities of the print jobs depending on the types of the print jobs. A type of a print job may include a print job that is derived from a regular print demand, or a print job derived from a document file in a portable memory device. Alternatively, and/or additionally, the print device may be configured to set priorities of the print jobs associated with multiple ports, such as multiple USB ports, e.g. USB1 and USB2, or other ports, e.g. secure card (SD) slot, or a combination thereof. In some scenarios, the print device may allow user to set the priorities of print jobs that are derived from digital document files in a portable memory device differently depending what port to which the portable memory device is plugged. For example, the print device may allow user to set the priorities of print jobs associated with USB1 port to be higher than the priorities of print jobs associated with USB2 port. Accordingly, the print device may handle the interruption of a current print job according to the priorities.

When a user plugs a portable memory device in a print device while there is a current print job, the print device may detect the portable memory device, determine the type of the current print job and subsequently determine the priority of the current print job based on the type of the print job, compare the priority of the current print job with that of a print job associated with the portable memory device. If the priority of the print job associated with the portable memory device is higher than that of the current print job, the print device will interrupt the current print job as described above. If the priority of the print job associated with the portable memory device is lower than or equal to that of the current print job, the print device will continue the current print job.

In a non-limiting example, the print device may receive a user input to set the priority of a print job derived from a document file in a portable memory device higher than that of a print job derived from a regular print demand. In such a case, when the user plugs a portable memory device in a print device while there is a current print job derived from a regular print demand, the print device may detect the portable memory device and interrupt the current print job derived from the regular print demand, and perform a new print job associated with the portable memory device.

In another non-limiting example, the print device may receive a user input to set the priority of a print job derived from a document file in a portable memory device lower than that of a print job derived from a regular print demand. In such a case, when the user plugs a portable memory device in a print device while there is a current print job derived from a regular print demand, the print device may detect the portable memory device and determine to wait for the current print job derived from a regular print demand to complete, then perform a new print job associated with the portable memory.

Optionally, once a document file is printed (whether in current or new print job), the device may delete the printed document file from the portable memory device 322. This is called the auto-delete option and can be part of the print instruction. Alternatively and/or additionally, if the auto-delete option is not included in the print instruction, the device may proceed to update the print history in the data store 323, which is further described with reference to FIG. 6.

Figure 4:
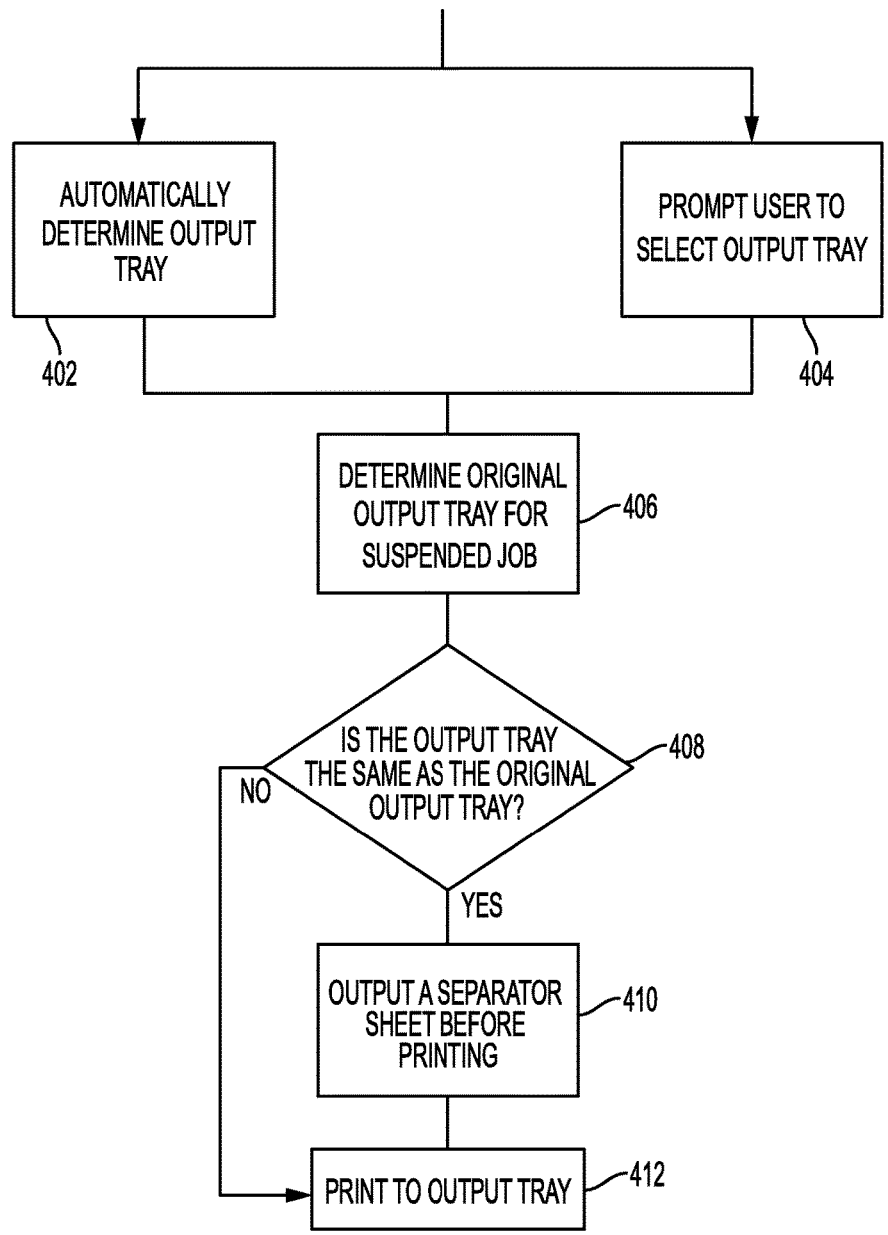
FIG. 4 is a diagram of an example of a process for handling the output tray of a print job.

In FIG. 4, with respect to performing a new (second) print job 320 (FIG. 3B), in some scenarios, the print device may determine which output tray the new print job is directed to. The print device may automatically determine the output tray of the new print job 402 based on at least one the following: capability of the output paper tray, requirement of the new print job or the print instructions. For example, the capability of the output paper tray may include the paper size and/or the remaining number of papers in the tray. The print device may check the paper size in the print instructions and compare that with the capability of the output paper tray to determine whether the output paper tray is adequate for the new print job. If the output paper tray is adequate for the new print job, the print device may automatically determine that output tray. In another example, the capability of the output paper tray may also include the number of remaining papers in the tray. Similarly, the print device may compare the number of remaining papers in the tray with the number of pages for the document file to be printed and decide whether the output tray is adequate. Alternatively, and/or additionally, the print device may also prompt a user to manually select the output paper tray 404 via a LUI.

In some scenarios, the print device may also determine the original output tray for the suspended print job (if any) 406, and determine whether it is the same output tray for the new print job 408. If the new print job and the suspended print job are directed to the same output tray, the print device may output a separator or divider sheet before performing the new print job 410. If the new print job and the suspended print job are directed to different output trays, the print device may simply perform the print job and print to the output tray 412.

Figure 5:
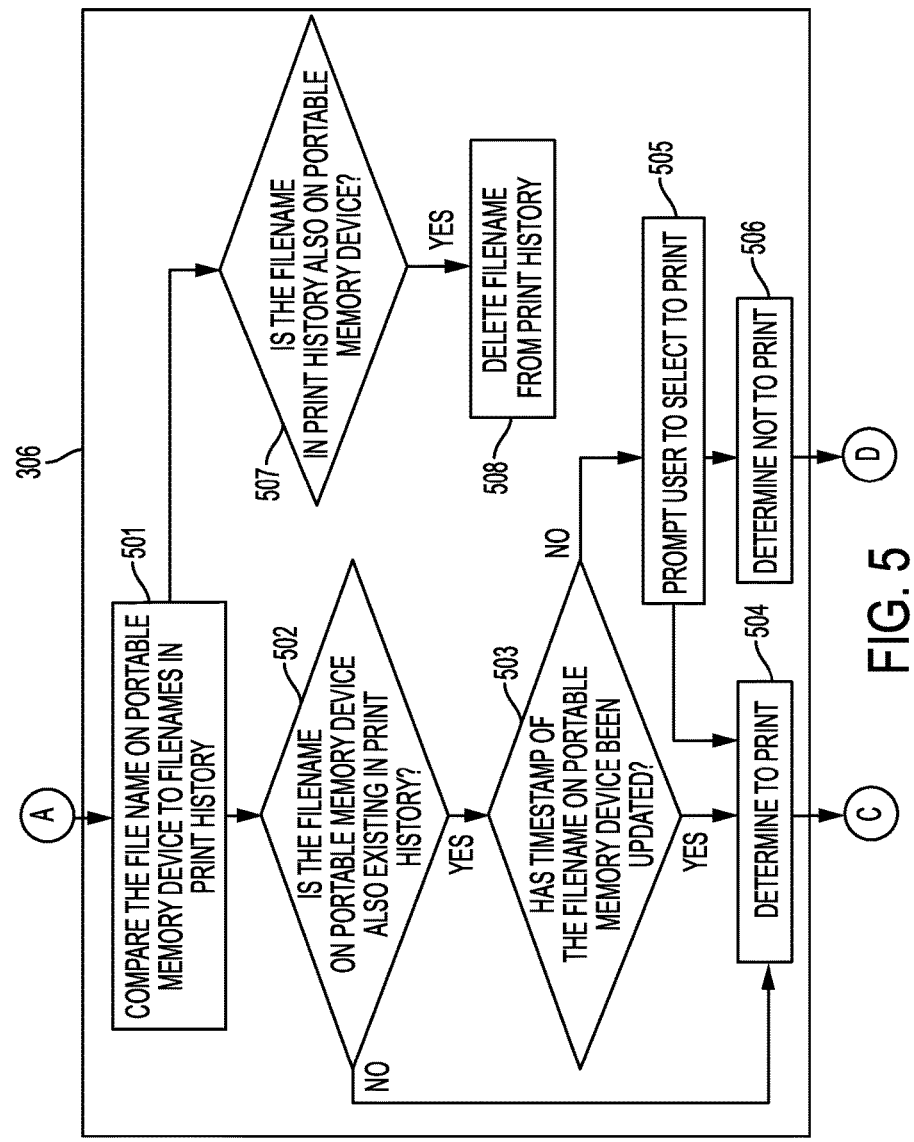
FIG. 5 is a diagram of an example of a process for automatic selection of documents to print.

Now, in FIG. 5, the methods for determining which of the document files on the portable memory device are to be printed 306 (also in FIG. 3A) are further explained. The print device will compare the identified filename of the document file on the portable memory device with the print history associated with the user 501. In some scenarios, the print device may access a data store remotely via the communication port (211 in FIG. 2), or a data store residing locally in the print device, and retrieve the print history associated with the user. In other scenarios, a general print history is stored in the data store and the print device may access the general print history from the data store. The print history may include the names of the document files that have been printed from previous print jobs, each name being associated with a timestamp. In an example, the timestamp may include the timestamp of the time when the associated document file on the portable memory device was lastly printed. The print history may be stored in the data store in any of the conventional formats, such as in a file system of the operating system of the server or in a database structure, such as in a SQL database, or as a flat file.

With further reference to FIG. 5, the print device may check whether the filename of the document file on the portable memory device exists in the print history 502. If so, the print device may determine that the document file on the portable memory device has already been printed before. The print device may further check whether the timestamp associated with the document file on the portable memory device has been updated since the last print job. For example, the device may compare the timestamp associated with the document file on the portable memory device with the timestamp associated with the filename in the print history 503. If the timestamp associated with the document file on the portable memory device is more recent than that associated with the filename in the print history, the device may determine that the document file on the portable memory device has been modified and thus may determine that the document file needs to be printed 504. Otherwise, the device may determine that the document file on the portable memory device has already been printed.

Once the device determines that a document file on the portable memory device has already been printed before, the device may either determine not to print 506, or prompt the user to make a selection. For example, the device may display a message on the LUI to notify the user that a previously printed document is identified and ask the user whether to select to print 505. Depending on user's selection, the device may accordingly determine to print the document file 504 or not to print the document file 506.

Alternatively and/or additionally, the print device may also check the filenames in the print history to see if the corresponding files also exist in the portable memory device 507. If the filenames in the print history do not have corresponding files in the portable memory device, the print device may determine that the filenames in the print history are stale and therefore delete the filenames from the print history 508.

Figure 6:
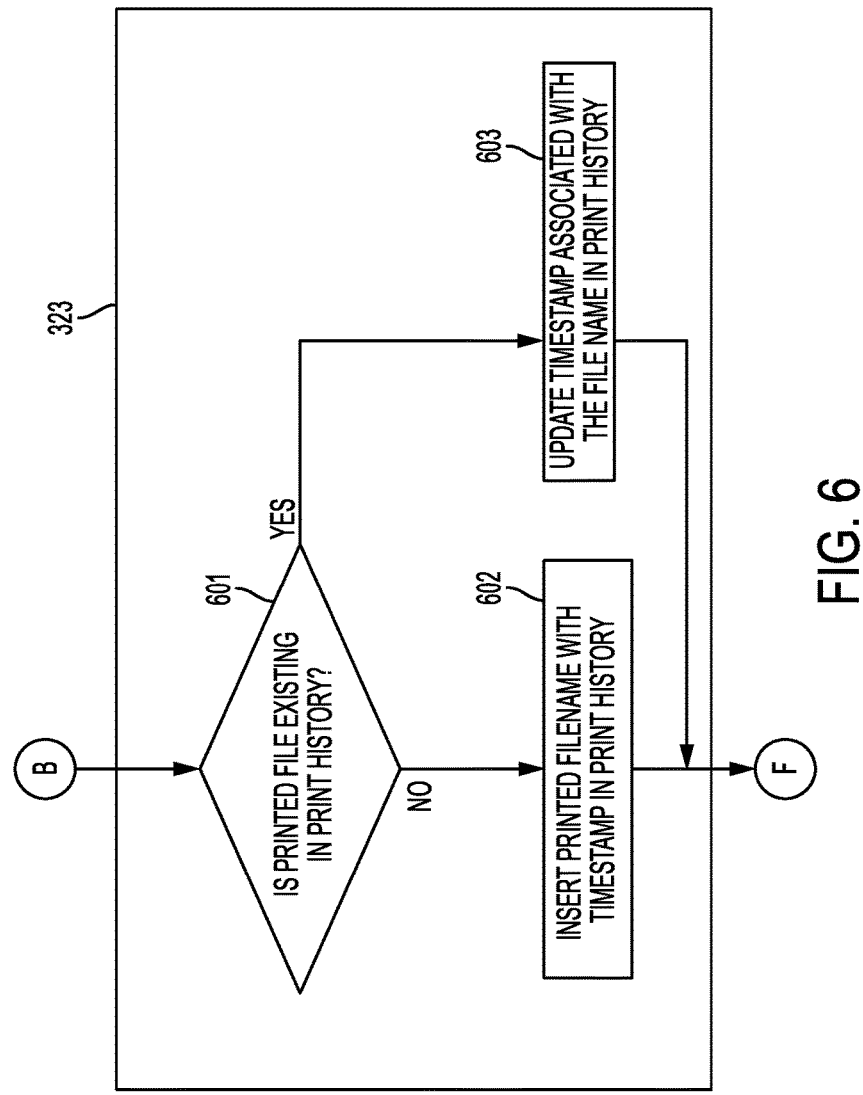
FIG. 6 is a diagram of an example of a process for updating a print history.

In FIG. 6, the methods for updating the print history in the data store (323 in FIG. 3B) are further explained. In some scenarios, the print device will check whether the filename of the printed document file on the portable memory device already exists in the print history 601. If the name of the printed document file does not exist in the print history, the device may insert the filename of the printed document file and the associated timestamp, which is the time the document file was printed on the portable memory device 602. If the filename of the printed document file already exists in the print history, it means that the printed document file has already been printed before. The device may update the timestamp associated with this filename in the print history with the time the document file was lastly printed 603.

The embodiments described in FIGS. 1-6 can be implemented in various ways to accommodate various print tasks without the use of the LUI. For example, the document printing system described in FIG. 1 may allow user to switch between multiple print devices e.g. 120, 121, and complete a print job using multiple print devices while automatically handling print job interruptions. In some scenarios, when printing on one print device is interrupted before a print job is completed, the document printing system may allow the user to simply unplug the portable memory device and plug into another print device to pick up the print job. For example, the user may have placed multiple document files on the portable memory device, e.g. five document files, and plug in the portable memory device into a print device for printing. The print device may have printed the first two document files. During the printing of the third document file or before all of the five document files are printed, the print device may have stopped for some reason. The reason for print interruption may be that the print engine of the print device has run out of consumables (paper, toner, etc.) and is forced to stop; or the user has forcibly unplugged the portable memory device (e.g. the USB drive) from the print device.

At the moment the print job is interrupted, the print device will update the print history to bring it up to date. In some scenarios, the print device may be configured to update the print history after each document file is printed. In such a case, when the print job is interrupted, the print history will already be up to date. Alternatively and/or additionally, the print device may be configured to update the print history after the entire print job is complete. In such a case, the print device may update the print history with the filenames and associated timestamps for all documents that have been printed right before the print job is interrupted.

Alternatively, and/or additionally, the print device may determine to handle an interrupted print job differently, depending on whether the interrupted print job is derived from a regular print demand sent to the print device or from a document file in the portable memory device. For example, if a print job that is interrupted or suspended is derived from a regular print demand, the print device may choose to handle it with normal interruption handling functions in the print device, if available. If a print job that is interrupted or suspended is derived from a document file in the portable memory device, the print device may choose to handle it with updating the print history as illustrated above.

When the user unplugs the portable memory device due to a print job interruption, and plugs in the same portable memory device into a second print device, the second print device may immediately detect that a portable memory device is plugged in 301 (in FIGS. 3A and 3B), and subsequently access the print history associated with the user from the data store 303 via the network, retrieve the print instructions and filenames from the portable memory device 304, 305 and determine which document files to print 306. Because the print history reflects the entire print operations before the first print device was stopped, by reading the print history, the second print device will be able to resume the printing of the remaining document files on the portable memory device that would have been printed by the first print device if the previous print job had not been interrupted. After the remaining document files are printed, the second print device may update the print history in the same manner described in FIG. 6.

In some scenarios, a user may plug a portable memory device in the print device, where the portable memory device contains a document file that was interrupted previously. The print device may check the print history and identify the previously interrupted document file. As described earlier in this document, the print device may further determine whether there is a current active print job in the print device, and if so, may determine to suspend the current print job and resume to print the document file from the portable memory device that was previously interrupted. Alternatively, the print device may determine that the priority of the current active print job in the print device is higher than that of the previously interrupted job derived from the document file on the portable memory device. In such case, the print device may determine to continue finishing the current print job before resuming to print the document file from the portable memory device that was previously interrupted. In these scenarios, the methods for updating print history and handling of output paper trays may also be implemented in similar manners as described earlier in this document.

Figure 7:
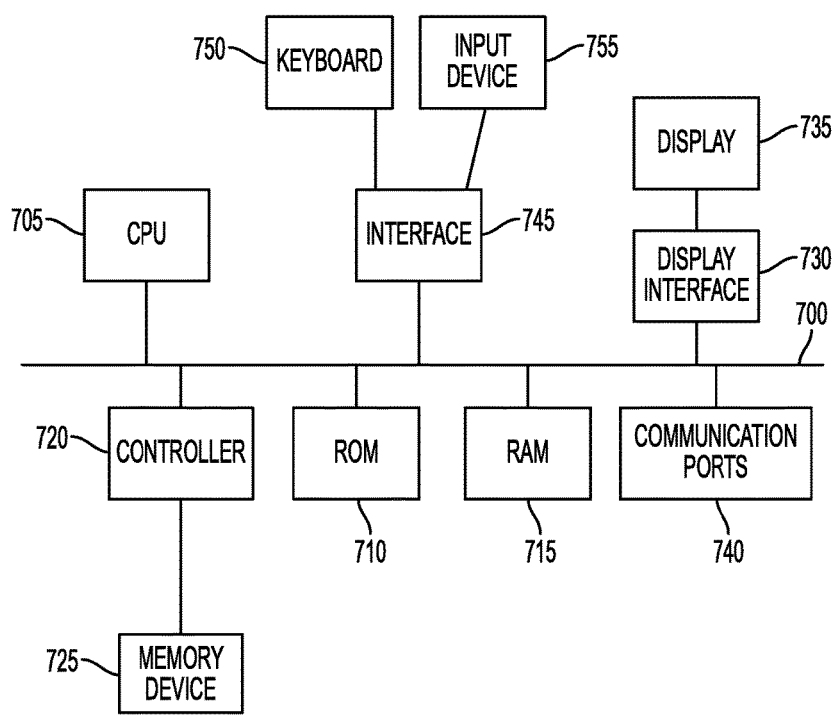
FIG. 7 is a block diagram of elements of a computing device on which the various systems and methods in this document could be implemented.

FIG. 7 depicts an example of internal hardware that may be included in any of the electronic components of the system, the print device or another device in the system such as the system 120, 121 (in FIG. 1). An electrical bus 700 serves as an information highway interconnecting the other illustrated components of the hardware. Processor 705 is a central processing device of the device, configured to perform calculations and logic operations required to execute programming instructions. As used in this document and in the claims, the terms "processor" and "processing device" may refer to a single processor or any number of processors or processor cores in one or more processors. The device may include read only memory (ROM) 710, random access memory (RAM) 715, or other types of memory devices, such as flash memory, hard drives and other devices capable of storing electronic data. A memory device may include a single device or a collection of devices across which data and/or instructions are stored.

An optional display interface 730 may permit information from the bus 700 to be displayed on a display device 735 in visual, graphic or alphanumeric format. An audio interface and audio output (such as a speaker) also may be provided. Communication with external devices may occur using various communication ports or devices 740 such as a portable memory device reader/writer, a transmitter and/or receiver, an antenna, an RFID tag and/or short-range or near-field communication circuitry. The communication device 740 may be attached to a communications network, such as the Internet, a local area network or a cellular telephone data network.

The hardware may also include a user interface sensor 745 that allows for receipt of data from input devices such as a keyboard 750, a mouse, a joystick, a touchscreen, a remote control, a pointing device, a video input device (camera) and/or an audio input device (microphone). Various methods of activation, validation and/or authorization described in this document may be performed by the central processing device 705 or a controller 720.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

The invention claimed is:

1. A document printing system, comprising:
a print device comprising:
a port configured to communicate with a portable memory device,
a print engine,
a processing device communicatively coupled to the port and the print engine, and
a non-transitory, computer-readable medium containing programming instructions that are configured to cause the processing device to:
cause the print device to perform a first print job,
detect a trigger event by determining that a portable memory device has become communicatively connected to the port,
upon detecting the trigger event, retrieve a digital document file to be printed and a print instruction from the portable memory device,
determine that the first print job is being performed in the print device,
suspend performance of the first print job,
determine a second print job that is derived from the digital document file,
in response to determining the second print job, automatically cause the print engine to perform the second print job based on the print instruction, wherein the programming instructions for performing the second print job comprise programming instructions configured to:
determine an output paper tray to which a document represented in the digital document file is to be printed; and
print the document to the output paper tray, wherein the programming instructions for printing the document to the output paper tray comprise programming instructions configured to:
determine an original paper tray to which the first print job was directed, and
if the output paper tray is the same as the original paper tray, output a separator sheet before printing the document to the output paper tray,
detect that the second print job has been completed or interrupted, and
upon detecting that the second print job has been completed or interrupted, automatically resume the first print job.

2. The system of claim 1, wherein:
the portable memory device contains a folder of a designated name that contains the digital document file; and
the programming instructions for detecting the trigger event also comprise programming instructions configured to detect the folder of the designated name.

3. The system of claim 1, wherein the programming instructions for determining the output paper tray comprise programming instructions configured to: automatically determine the output paper tray based on at least one of the following: a capability of the output paper tray, a requirement of the second print job, or the print instruction; or prompt a user to manually select the output paper tray.

4. The system of claim 2, wherein the print instruction is encoded to a folder name of the folder of the designated name or a folder name of a subfolder of the folder of the designated name.

5. The system of claim 4, wherein:
the folder name is indicative of a number of copies to be printed; and
the programming instructions for printing performing the second print job comprise programming instructions configured to print the number of copies of a document represented in the digital document file automatically.

6. The system of claim 1, wherein the programming instructions for detecting that the second print job was completed or interrupted comprise programming instructions configured to cause the processing device to detect that the portable memory device has become disconnected from the port.

7. The system of claim 1, further comprising a data store containing a print history, wherein:

the print device further comprises a communication port for communicating with the data store and obtaining information from the print history; and the programming instructions for retrieving the digital document file to be printed from the portable memory device comprise programming instructions configured to:
access the print history from the data store, and
use the print history to determine that the digital document file has not been printed and retrieve that digital document file to be printed.

8. The system of claim 7, wherein the programming instructions further comprising additional programming instructions configured to:
upon detecting that the second print job has been completed, transmit a communication to the data store to update the print history to reflect that the digital document file is printed.

9. The system of claim 1, wherein:
the programming instructions for retrieving the digital document file from the portable memory device also comprise programming instructions for retrieving additional digital document files from the portable memory device;
the second print job is also derived from the additional digital document files; and
the programming instructions for detecting that the second print job has been completed comprise programming instructions configured to:
(i) detect that the digital document file in the portable memory device is printed,
(ii) check the additional digital document files to determine a next digital document file to be printed,
(iii) print a document represented in the next digital document file based on the print instruction,
(iv) repeat steps (ii) and (iii) until all documents of the additional digital document files are printed, and
(v) determine that the second print job has been completed.

10. A method for automatically processing job interruptions in a print system, comprising, by a processing device of a print device:
cause the print device to perform a first print job;
detecting a trigger event by determining that a portable memory device has become communicatively connected to a port of the print device;
upon detecting the trigger event, retrieving a digital document file to be printed and a print instruction from the portable memory device;
determining that the first print job is being performed in the print device;
suspending performance of the first print job;
determining a second print job that is derived from the digital document file;
in response to determining the second print job, automatically causing a print engine of the print device to perform the second print job based on the print instruction, wherein performing the second print job comprises:
determining an output paper tray to which a document represented in the digital document file is to be printed, and
printing the document to the output paper tray, wherein printing the document to the output paper tray comprises:
determining an original paper tray to which the first print job was directed; and
if the output paper tray is the same as the original paper tray, outputting a separator sheet before printing the document to the output paper tray;
detecting that the second print job has been completed or interrupted; and
upon detecting that the second print job has been completed or interrupted, automatically resuming the first print job.

11. The method of claim 10 wherein the portable memory device contains a folder of a designated name that contains the digital document file, further comprising detecting the folder of the designated name.

12. The method of claim 10, wherein determining the output paper tray comprises: automatically determining the output paper tray based on at least one of the following: a capability of the output paper tray, a requirement of the second print job, or the print instruction; or prompting a user to manually select the output paper tray.

13. The method of claim 11, wherein the print instruction is encoded to a folder name of the folder of the designated name or a folder name of a subfolder of the folder of the designated name.

14. The method of claim 13, wherein performing the second print job comprises printing a number of copies of a document represented in the digital document file automatically, wherein the number of copies to be printed is indicated in the folder name.

15. The method of claim 10, wherein detecting that the second print job was completed or interrupted comprises detecting that the portable memory device has become disconnected from the port.

16. The method of claim 10, wherein retrieving the digital document file to be printed from the portable memory device comprises:
accessing a print history from a data store; and
using the print history to determine that the digital document file has not been printed and retrieving that digital document file to be printed.

17. The method of claim 16, further comprising, by the processing device of the print device:
upon detecting that the second print job has been completed, transmitting a communication to the data store to update the print history to reflect that the digital document file is printed.

18. The method of claim 10, wherein:
retrieving the digital document file from the portable memory device also comprises retrieving additional digital document files from the portable memory device, and the second print job is also derived from the additional digital document files; and
detecting that the second print job has been completed comprises:
(i) detecting that the digital document file in the portable memory device is printed,
(ii) checking the additional digital document files to determine a next digital document file to be printed,
(iii) printing a document represented in the next digital document file based on the print instruction,
(iv) repeating steps (ii) and (iii) until all documents of the additional digital document files are printed, and
(v) determining that the second print job has been completed.

* * * * *